Dec. 12, 1967  R. L. ELLIS  3,357,364
FLUID DISPLACEMENT DEVICES HAVING RADIALLY ARRANGED CYLINDERS
Filed Sept. 30, 1965  2 Sheets-Sheet 1
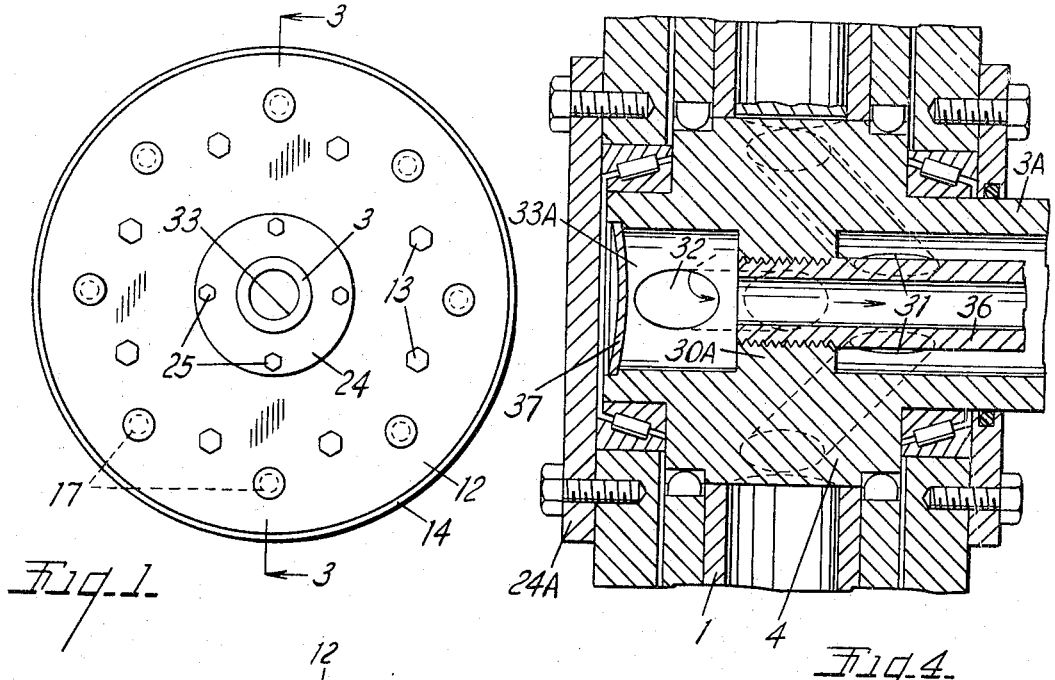
Fig. 1.
Fig. 4.
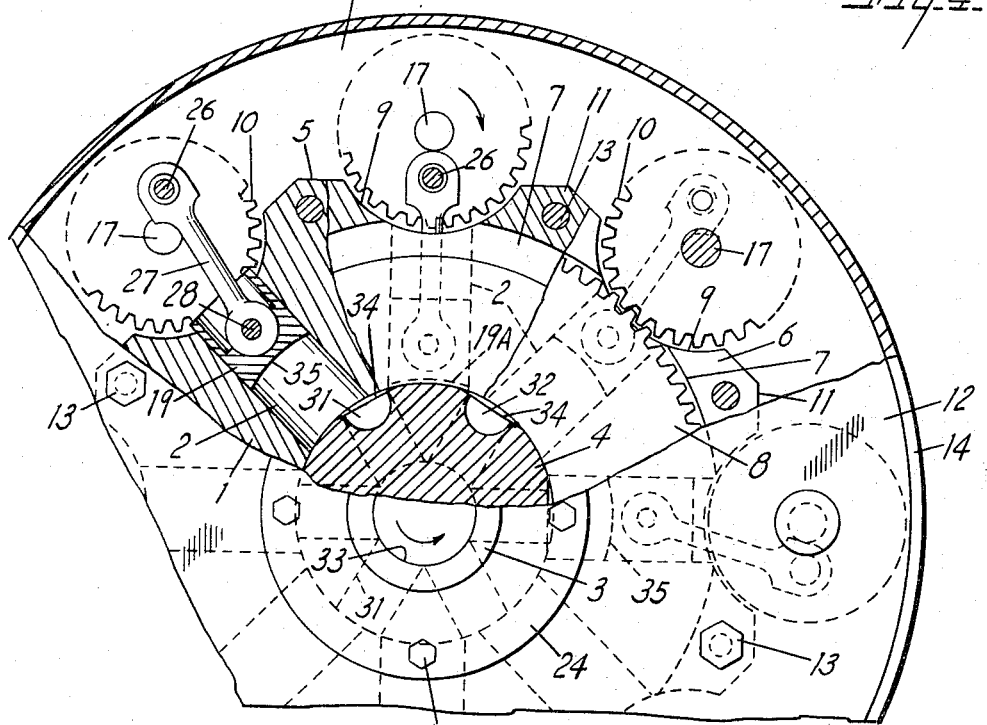
Fig. 2.
INVENTOR.
Robert L. Ellis
BY
ATTORNEY.

INVENTOR.
Robert L. Ellis
BY
ATTORNEY.

United States Patent Office 3,357,364
Patented Dec. 12, 1967

3,357,364
FLUID DISPLACEMENT DEVICES HAVING RADIALLY ARRANGED CYLINDERS
Robert L. Ellis, Constantine, Mich., assignor to Ward Aero, Inc., Three Rivers, Mich.
Filed Sept. 30, 1965, Ser. No. 491,705
18 Claims. (Cl. 103—174)

ABSTRACT OF THE DISCLOSURE

A cylindrical valve having plural balanced inlet and outlet ports spaced angularly therearound, the valve rotating in the open ends of radially disposed cylinders arranged around an inscribed polygon. Pistons in the cylinders having concave faces fitted to the circumference of the valve, the pistons being reciprocated by crank pins carried by pairs of pinions mounted on end members secured to the ends of the cylinder body, with central sun gears rotated with the valve driving the pinions.

---

This invention relates to improvements in fluid displacement devices having radially arranged cylinders.

The principal objects of this invention are:

First, to provide a fluid pressure pump or motor having a body with a plurality of circular cylinders arranged radially around a central shaft in which the pistons in the cylinders reciprocate to closely adjacent the surface of a rotating valve body positioned in the center of the body and driven by the shaft and drive the shaft by means of connecting rods connected eccentrically to balanced pairs of pinions disposed around the body and drivingly engaged with sun gears at the ends of the body and in turn drivingly connected with the valve body and shaft to provide a balanced pump or motor with a minimum number of parts and with angularly balanced rotary driving thrust and axially balanced pressures on the valve.

Second, to provide a fluid pressure displacement device of the radial cylinder type which contains a minimum number of parts that can be easily and accurately assembled and retained in balanced operating condition with a minimum of close tolerance connections and fitting of parts.

Third, to provide a fluid displacement device of the radial cylinder type in which there is a minimum of head clearance between the advanced ends of the pistons and the valve element which opens directly to the inner ends of the cylinders for maximum efficiency in the operation of the device either as a pump or as a motor.

Fourth, to provide a fluid pressure operated device of the radial cylinder and piston type which occupies a minimum of radial and axial space for a given size and stroke of the pistons of the device.

Other objects and advantages of the invention will be apparent from a consideration of the following description and claims. The drawings of which there are two sheets illustrate a highly practical form of the device of the invention and one modified form of shaft and valve structure particularly adapted to permit utilizing the device as a rotary motor with a fixed supporting shaft.

FIGURE 1 is an end elevational view of the pump or motor.

FIGURE 2 is an enlarged fragmentary end elevational view of the motor with parts progressively broken away axially of the motor to show the internal construction thereof.

FIGURE 4 is a fragmentary axial cross sectional view similar to the central portion of FIGURE 3 but illustrating a modified form of shaft and valve mechanism.

Figure 3:
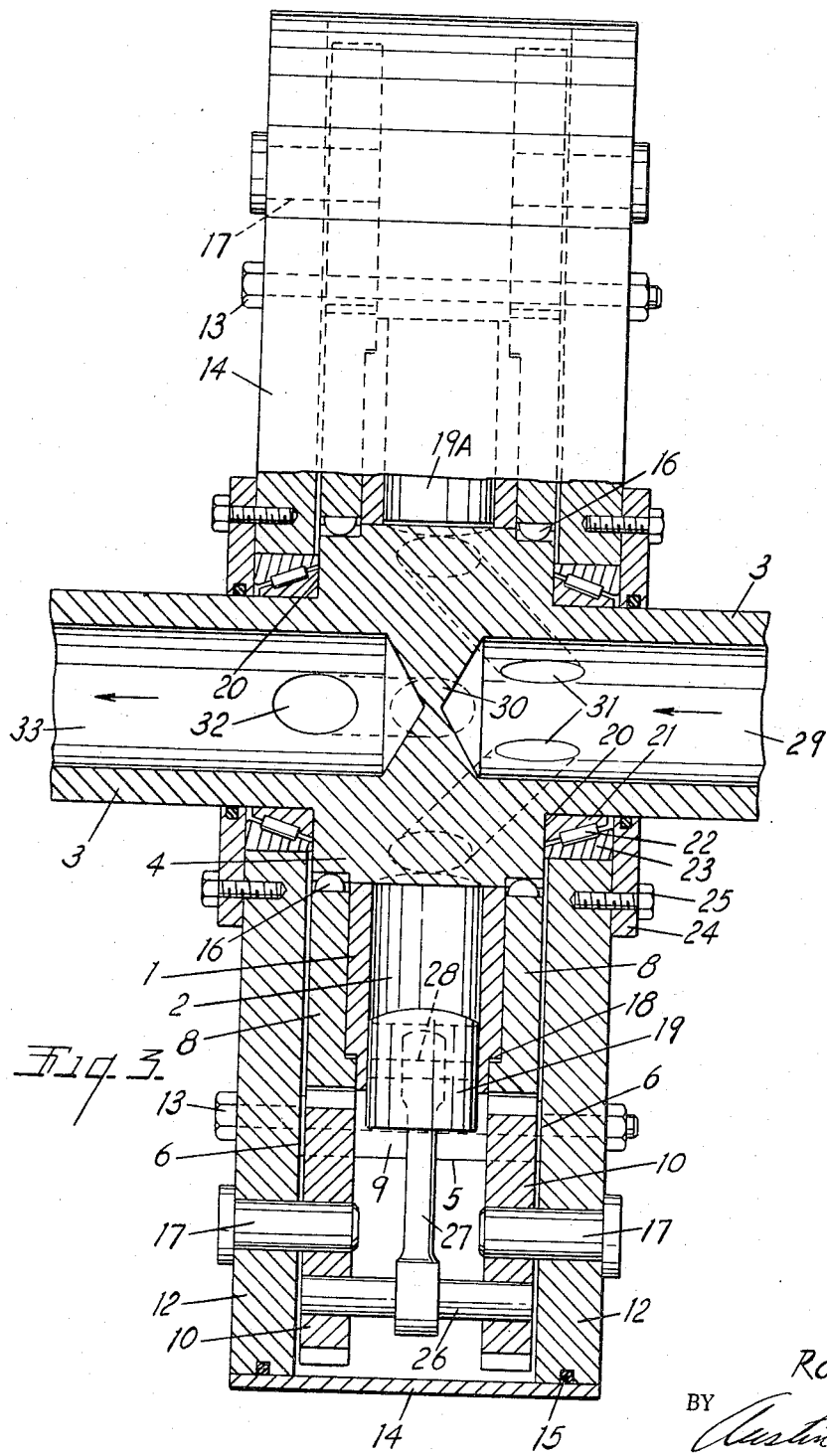
FIGURE 3 is a side view of the motor partially broken away in angular cross section along the plane of the line 3—3 in FIGURE 1.

The device as previously indicated may be used as a pump or compressor or as a fluid pressure operated motor. For convenience in description it will be described herein as a motor adapted to be operated by fluid pressure such as hydraulic pressure. As appears most clearly in FIGURES 2 and 3 the motor has a body 1 of sufficient thickness to have the cylinders 2 bored radially therein in equal angularly spaced relation about a central shaft 3 and cylindrical valve body 4. The periphery of the body 1 is polygonal with sides or edges 5 corresponding in number to the number of cylinders 2. In the example illustrated the motor body is octagonal and has eight radially disposed cylinders.

The ends or axial faces 6 of the motor body are centrally and axially recessed as at 7 to provide for space for two sun gears 8 positioned one on each end of the body. The outer peripheral edges 5 of the body are cut away in outwardly concave segmental recesses 9 which open into the axial recesses 7 to receive pinions 10 as will be described. The sides or axial end faces of the motor body are thus mostly cut away leaving segment like projetcions 11 between each of the pinions 10. Secured in tight abutting engagement against the remaining faces of the segment 11 are cylindrical end members 12 which are clamped against the sides of the body by bolts 13 that extend through the projecting segments 11. A cylindrical closure band or cover 14 is positioned around the periphery of the end members 12 and sealed thereto against the leakage of fluid by annular seals 15, see FIGURE 3.

The cylindrical valve body 4 in the example illustrated is formed integrally with the shaft and is keyed at 16 with the sun gears 8 which project radially outwardly to adjacent the outer ends of the cylinders 2. The end members 12 carry a series of circularly arranged pins or stud shafts 17 which project into the space surrounding the body to rotatably support the pinions 10 in merging engagement with the sun gears 8. With particular reference to FIGURE 3 it will be noted that the segmental recesses 9 are axially deeper than the end recesses 7 as is indicated at 18. This permits the periphery of the sun gears and the teeth thereon to be wider and thus stronger where the greatest strength is needed. The widening of the sun gears is permissible because the widening occurs at the outer limit of motion of the pistons 19 in the cylinders where the cylinder walls will not be subjected to maximum operating pressures.

The motor body 1, sun gears 8, and end members 12 are all secured together so that all move angularly relative to the shaft 3 and valve body 4, the valve body being an integral radial enlargement of the shaft 3 provides axially outwardly facing end shoulders 20 against which are abutted the inner races 21 of roller bearing assemblies having rollers 22 and outer races 23. The races 23 are fitted within the end plates or members 12 and rotatably support the end members and in turn the motor body from the shaft so that wear or supporting pressure on the surface of the valve body and the inner surface of the motor body is minimized. The bearing assemblies 21, 22 and 23 are secured in place by annular end rings 24 which are secured to the end members by cap screws 25 and overlap the outer races of the bearings to hold the bearings axially against the shoulders 20 on the valve body.

The pinions 10 which are mounted in opposed pairs at the outer ends of each cylinder 2 carry a crank pin 26 between each opposed pair of pinions and the crank pins are swingably engaged with the outer ends of connecting rods 27. The crank pins 26 are eccentric to the centers of rotation of the pinions and rotation of the pinions causes the crank pins to oscillate about the stud shafts 17 and reciprocate the connecting rods. The radially inner ends of the connecting rods are tiltably connected by wrist pins 28 with the pistons 19.

From the foregoing it will be apparent that the timed admission of hydraulic pressure to the several cylinders and the exhausting of this hydraulic pressure will cause the pistons to reciprocate between the fully retracted positions shown in FIGURE 3 and the fully advanced position of the piston in the top cylinder of FIGURE 2 indicated at 19A. Reciprocation of the pistons causes the connecting rods 27 to rotate the crank pins 26 which in turn rotate the pinions and rotate the ring gears 8.

Fluid pressure is admitted to and exhausted from the several cylinders 2 by means of branch passages opening from the inlet passage 29 formed axially in one end of the shaft 3 and extending to a central partition 30 located within the valve body 4. In the example illustrated there are six branch passages with three inlet branches 31 spaced at 120° spacing and alternating with three outlet branch passages 32 also spaced 120° apart but inclined oppositely to open into the discharge passage 33 in the other end of the shaft 3.

It is apparent that with the inner end of each cylinder 2 subjected alternately to inlet and exhaust pressures through approximately 120° of rotation, the pistons 19 should make a complete reciprocating cycle during this 120° rotation of the valve member, and the pinions 10 should make a complete revolution in the same time so the pitch ratios of the sun gears 8 and the pinions 10 are about three to one. The time or degree of angular registry of the branch passages 31 and 32 with the several cylinders 2 may be increased by providing chordal surfaces 34 on the periphery of the valve body 4. Desirably the inner faces on the pistons 19 are shaped concavely as at 35 to the same radius as the radius of the valve body 4. This reduces to a minimum the dead head space between the piston and the valve member so there is no loss of efficiency in the operation of the device either as a motor or as a pump or compressor.

The modified form of valve and shaft structure shown in FIGURE 4 is particularly adapted for use as a motor in which the body 1 is secured to a part to be driven such as a wheel of a vehicle while the shaft 3A is fixedly secured to the vehicle and supplied with pressure from a suitable source. The shaft 3A has the same radially enlarged valve body 4 but the partition 30A is more substantial and thicker in size to supportingly receive an inner conduit or tube 36 which forms the outlet passage from the motor by communicating with the recess 33A in the short end of the shaft. The recess 33A is closed by a suitable plug 37 and the branch passages 32 open into this end of the shaft as before. The branch passages 31 open from the annular space between the pipe 3A and the discharge pipe or tube 36 since the shaft 3A does not project beyond the one end of the motor. A complete closure plate 24A is substituted for the end ring on that end of the motor to retain the bearing in place.

From FIGURE 2 it will be observed that the cylinders 2 substantially fill the annular space around the cylindrical valve body 4. Some wall thickness is retained to separate the inner end of each cylinder from its adjacent cylinders and contain the pressures therein. While the diameters of the inner ends of the cylinders 2 (viewed in a plane common to all cylinders and perpendicular to the axis of rotation of the valve body 4) approach or approximate a regular polygon inscribed within a circle having a diameter equal to the diameter of the valve body, those diameters are a small but appreciable amount less than the length of the side of such a polygon.

The axis of each cylinder perpendicularly intersects the center of each side of such a polygon, so that the minimum wall thickness between the inner ends of adjacent cylinders is equal to the difference between the length of the diameter of the cylinders and the length of the sides of the polygon.

The length of the chordal surfaces 34 across the outer ends of the ports 31 and 32 is approximately equal to the diameter of the cylinders so that each port may communicate simultaneously with two adjacent cylinders. Adjacent inlet and outlet ports may communicate briefly simultaneously, and for a very small fraction of their total areas, as is shown at the top vertical cylinder in FIGURE 2. At this point, the piston and its crank pin are on dead center.

What is claimed as new is:
1. In a fluid displacement device having a plurality of circular cylinders with their axes arranged radially around a shaft at equi-angularly spaced points,
   a body in which said cylinders are formed and having a central shaft and valve opening formed therethrough and intersecting the inner ends of said cylinders throughout the circumference of the cylinders,
   a cylindrical valve body relatively rotatably mounted in sealing fit within said opening at the inner ends of said cylinders and directly connected to said shaft for rotation with the shaft,
   a pair of sun gears located one on each side of said first body and connected to said valve body for rotation therewith,
   a pair of end members positioned on the axially outer sides of said sun gears from said first body and projecting radially therebeyond,
   a plurality of bolts extending through radially outer portions of said first body, in the segmental portions of the body between said cylinders and securing said end members to the ends of said first body,
   the end faces of said first body having central circular recesses formed therein receiving said sun gears, and arcuate recesses formed in their periphery between said segmental portions,
   stud shafts carried by said end members in opposed pairs located radially outwardly of each of said cylinders,
   pinions rotatably mounted on said stud shafts and meshing with said sun gears,
   crank pins carried by the pairs of pinions at the end of each cylinder and extending transversely thereacross,
   connecting rods pivoted on said crank pins and extending into said cylinders,
   pistons reciprocably positioned in said cylinders and angularly tiltably connected to said connecting rods to extend to closely adjacent the surface of said valve body in the radially inwardly rotated positions of said crank pins on said pinions,
   and means within said shaft and said valve body forming fluid inlet and outlet passages extending axially of the shaft with branch passages from each opening alternately to the surface of said valve body at equiangularly spaced positions around the valve body, there being at least three inlet branch passages and an equal number of outlet branch passages in said valve body.

2. A fluid displacement device as defined in claim 1 in which said pistons have faces curved along surfaces concentric with the surface of said valve body.

3. A fluid displacement device as defined in claim 2 in which the surface of said valve body has chordal surfaces formed thereon intersecting the ends of said branch passages and extending along the valve body a distance approximately equal to the diameter of said cylinders.

4. A fluid displacement device as defined in claim 1 in which said pistons have faces curved along surfaces concentric with the surface of said valve body.

5. A fluid displacement device as defined in claim 1 in which said sun gears are keyed to the ends of said valve body.

6. A fluid displacement device as defined in claim 5 in which there are bearings positioned between said end members and said shaft and against the ends of said valve body, and retainer rings secured to the outer sides of said end members securing said bearings in place between said end members and said shaft.

7. A fluid displacement device as defined in claim 6 in which said bearings are roller bearings with races engaged by said retainer rings, and said retainer rings have annular seals engaged with the surface of said shaft axially outwardly of said bearings.

8. A fluid displacement device as defined in claim 1 in which said inlet and outlet passages are non-intersecting bores formed axially from opposite ends of said shaft, and said branch passages are angled bores formed from the surface of said valve body to the passages in said shaft.

9. A fluid displacement device as defined in claim 8 in which said valve body is formed as an integral radial enlargement of said shaft.

10. A fluid displacement device as defined in claim 7 in which said inlet and outlet passages are non-intersecting bores formed axially from opposite ends of said shaft, and said branch passages are angled bores formed from the surface of said valve body to the passages in said shaft.

11. A fluid displacement device as defined in claim 1 in which said end members have a cylindrical outer closure band sealed therearound and extending across the ends of said cylinders and the outsides of said pinions.

12. A fluid displacement device as defined in claim 1 in which said shaft is tubular with a transverse partition located centrally of said valve body, means closing one end of said shaft in axially spaced relation to said partition, and a central conduit extending in radially spaced relation through the other end of said shaft and through said partition to between said closing means and said partition, alternate ones of said branch passages opening to said one end of said shaft.

13. A fluid displacement device as defined in claim 12 in which said shaft and said valve body are integrally formed.

14. A fluid displacement device as defined in claim 13 in which said valve body is radially enlarged relative to said shaft, roller bearings having inner races positioned around said shaft and outer races rotatably supporting said end members, an annular end ring positioned around said shaft and secured to one end member in end thrust retaining engagement with a race of one bearing, and an end plate secured to the other end member and extending across said one end of said shaft in end thrust retaining engagement with a race of the other of said bearings.

15. A fluid displacement device having a first body with a cylindrical valve bore formed therethrough and a cylindrical valve body relatively rotatably and sealingly received in said valve bore, said first body having at least three circular cylindrical cylinders formed therein and disposed in radially extending and equi-angularly spaced and coplanar relation around the axis of said valve body with the inner ends of the cylinders intersecting said valve bore, means forming inlet and outlet passages in said valve body with at least two pairs of branch inlet and branch outlet passages opening alternately to the surface of said valve body at equi-angularly spaced positions around the valve body, there being separating surfaces on the surface of said valve body between the outer ends of adjacent branch passages, the openings of said branch passages to the surface of said valve body extending transversely of the valve body in a common diametrical plane of said cylinders for a distance approximately equal to the diameter of the cylinders, a central gear disposed coaxially with said valve body and relatively nonrotatably connected thereto, an end member relatively nonrotatably connected to said first body member and projecting radially beyond the ends of said cylinders, pinions rotatably carried by the projecting portions of said end member and disposed parallel to the axis of said valve body at points spaced radially outwardly from the outer ends of said cylinders and meshing with said central gear, crank means carried by said pinions eccentric to the axes of the pinions, pistons disposed in each of said cylinders and having inner faces disposed along segmental cylindrical surfaces of a radius equal to the radius of said valve body, and connecting rods each having one end swingably conected to one of said pistons and with its other end rotatably connected to the crank means on the pinion associated with cylinder in which the piston is mounted, said cylinders in said first body having a diameter that is a small but appreciable length less than the length of the sides of a regular polygon having the same number of sides as the number of said cylinders and inscribed in a circle having a diameter equal to the diameter of said valve bore, whereby there is a continuous wall of appreciable thickness at its thinnest point between each of said cylinders.

16. A fluid displacement device as defined in claim 15 in which the ratio of the diameter of said central gear to the diameter of said pinions is equal to the reciprocal of the number of said pairs of branch passages.

17. A fluid displacement device as defined in claim 16 in which there are two of said central gears positioned one on each side of said first body, and two of said end members positioned on the axially outer sides of said central gears, and pairs of said pinions with the pinions of each pair mounted on said two end members, said crank means being crank pins extending between the pinions of each pair, and connecting bolts extending between said end members and passed through said first body member at points disposed radially outwardly of said central gears and angularly spaced between said pinions.

18. A fluid displacement device as defined in claim 17 in which the periphery of said first body member has outwardly concave recesses formed therein receiving portions of the peripheries of said pinions.

References Cited

UNITED STATES PATENTS

| | | | |
|---|---|---|---|
| 1,328,033 | 1/1920 | Chase | 91—204 |
| 1,455,443 | 5/1923 | Mayer | 103—174 |
| 1,742,088 | 12/1929 | Maxson | 91—175 |
| 1,932,636 | 10/1933 | Ochtman | 230—225 |
| 2,160,612 | 5/1939 | Alpern | 91—180 |
| 2,221,501 | 11/1940 | Waite | 103—161 |
| 2,404,305 | 7/1946 | Logus | 103—174 |
| 2,737,122 | 3/1956 | Tacconi | 103—161 |

FOREIGN PATENTS

| | | |
|---|---|---|
| 446,080 | 1/1948 | Canada. |
| 438,153 | 11/1935 | Great Britain. |

ROBERT A. O'LEARY, *Primary Examiner.*

WILLIAM L. FREEH, DONLEY J. STOCKING,
*Examiners.*